(12) United States Patent　(10) Patent No.: US 11,943,550 B2
Shi et al.　(45) Date of Patent: Mar. 26, 2024

(54) DUAL-MODALITY NEUROMORPHIC VISION SENSOR

(71) Applicant: TSINGHUA UNIVERSITY, Beijing (CN)

(72) Inventors: Luping Shi, Beijing (CN); Zheyu Yang, Beijing (CN); Rong Zhao, Beijing (CN); Jing Pei, Beijing (CN); Haizheng Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 88 days.

(21) Appl. No.: 17/788,909

(22) PCT Filed: Jan. 21, 2020

(86) PCT No.: PCT/CN2020/073523
§ 371 (c)(1),
(2) Date: Jun. 24, 2022

(87) PCT Pub. No.: WO2021/128533
PCT Pub. Date: Jul. 1, 2021

(65) Prior Publication Data
US 2023/0033544 A1　Feb. 2, 2023

(30) Foreign Application Priority Data
Dec. 24, 2019　(CN) .......................... 201911348653.8

(51) Int. Cl.
*H04N 25/702*　(2023.01)
*G06V 10/147*　(2022.01)
(Continued)

(52) U.S. Cl.
CPC ......... *H04N 25/702* (2023.01); *G06V 10/147* (2022.01); *H04N 25/53* (2023.01);
(Continued)

(58) Field of Classification Search
CPC ...... H04N 25/702; H04N 25/75; H04N 25/53; H04N 25/77; H04N 25/47; H04N 25/133;
(Continued)

(56) References Cited

U.S. PATENT DOCUMENTS 9,047,568 B1\* 6/2015 Fisher .................... G06N 3/049
9,987,167 B2\* 6/2018 Lorach ................. G06V 10/451
(Continued)

FOREIGN PATENT DOCUMENTS

CN　102984471 A　3/2013
CN　105163048 A　12/2015
(Continued)

*Primary Examiner* — Marly S Camargo
(74) *Attorney, Agent, or Firm* — Browdy and Neimark, PLLC (57) ABSTRACT

Embodiments of the present disclosure provide a dual-modality neuromorphic vision sensor. A first-type current-mode active pixel sensor (APS) circuit can mimic excitatory rod cells, to perceive light intensity gradient information in a target light signal, thereby improving a dynamic arrange of an image sensed by a neuromorphic, vision sensor and its shooting speed. In addition, a first-type control switch is introduced for each of non-target first-type photosensitive devices, to control the obtained light intensity gradient information, and adjust the dynamic arrange of the image sensed by the neuromorphic vision sensor, thereby adjusting the shooting speed, and realizing a reconfigurable effect A voltage-mode APS can mimic cone cells, to output a target voltage signal representing light intensity information in the target light signal, and perceive the light intensity information in the target light signal. In this way, the obtained light intensity information represented by the target voltage signal has a higher precision, thereby ensuring the image quality.

10 Claims, 6 Drawing Sheets

(51) Int. Cl.
*H04N 25/13* (2023.01)
*H04N 25/47* (2023.01)
*H04N 25/53* (2023.01)
*H04N 25/75* (2023.01)
*H04N 25/77* (2023.01)

(52) U.S. Cl.
CPC ............ *H04N 25/75* (2023.01); *H04N 25/77* (2023.01); *H04N 25/134* (2023.01)

(58) Field of Classification Search
CPC .... H04N 25/134; H04N 23/10; G06V 10/147; G06V 40/19
See application file for complete search history.

(56) References Cited

U.S. PATENT DOCUMENTS

| | | | |
|---|---|---|---|
| 10,133,944 B2 * | 11/2018 | Zink | G06N 3/063 |
| 10,235,565 B2 * | 3/2019 | Zink | G06N 3/049 |
| 10,726,337 B1 * | 7/2020 | Thibeault | G06N 3/10 |
| 2011/0119264 A1 * | 5/2011 | Breitwisch | G11C 13/0002 |
| | | | 706/33 |
| 2019/0356849 A1 * | 11/2019 | Sapienza | G06V 20/10 |
| 2021/0312257 A1 * | 10/2021 | Schilling | G05N 3/045 |
| 2023/0050794 A1 * | 2/2023 | Shi | H04N 25/702 |

FOREIGN PATENT DOCUMENTS

| | | |
|---|---|---|
| CN | 108200362 A | 6/2018 |
| CN | 108566524 A | 9/2018 |
| WO | 2019221580 A1 | 11/2019 |

\* cited by examiner

DUAL-MODALITY NEUROMORPHIC VISION SENSOR

FIELD OF TECHNOLOGY

The present disclosure relates to the technical field of integrated circuits, and in particular to a dual-modality neuromorphic vision sensor.

BACKGROUND

With the deepening of research on the image sensor and the image processing and recognition algorithms, the neuromorphic vision sensor is increasingly important in many application fields such as industrial manufacturing, intelligent transportation, and intelligent robots.

The neuromorphic vision sensor mainly mimics the modality on the human retina. The human retina mainly includes two types of photoreceptors, namely, cone cells and rod cells, corresponding to two different modalities respectively. The cone cell is mainly sensitive to absolute light intensity information and color information, and has a high image restoration accuracy, but at a slow speed. On the contrary, the rod cell mainly perceives a change in light intensity information, at a fast speed, within a large dynamic range, but is unable to perceive absolute light intensity information and color information.

However, the neuromorphic vision sensors in the prior art each can mimic only one of the modalities on the human retina in a single perception mode, and therefore can perceive only a specific type of information. For example, the traditional camera, similar to cone cells, mainly perceives color information. The dynamic vision sensor (DVS), similar to the rod cells, mainly perceives the change of light intensity information. Further, application scenarios of the single-modal vision sensors are limited. For example, as for the neuromorphic vision sensor similar to the cone cells, although it is widely used in home entertainment electronic equipment, because such a sensor captures absolute light intensity information rather than the change in light intensity information, and in the field of industrial control, usually faces the problems such as an insufficient speed and a small dynamic range, it is difficult to apply. As for the neuromorphic vision sensor similar to rod cells, although the perception speed is fast, it is only sensitive to moving targets, which makes it difficult to capture images, or the captured images are of poor quality. Therefore, this sensor is difficult to meet the needs of entertainment electronic equipment. Moreover, because the neuromorphic vision sensor only contains a single perception mode, the neuromorphic vision sensor fails when this perception mode fails, which has great limitations on robots such as unmanned vehicles and drones that have high requirements for stability. In addition, the main indicators for evaluating the performance of the neuromorphic vision sensors are image quality, dynamic range, and shooting speed. It can be seen from the above that in the framework of the traditional neuromorphic vision sensors, the three indicators are usually mutually exclusive. For example, when the shooting speed is increased, the dynamic range of the neuromorphic vision sensor is reduced. When the image quality is improved, the shooting speed is generally reduced. It is difficult to take into account both.

Therefore, it is urgent to provide a dual-modality neuromorphic vision sensor.

SUMMARY

To overcome or at least resolve some of the foregoing problems, embodiments of the present disclosure provide a dual-modality neuromorphic vision sensor.

The embodiments of the present disclosure provide a dual-modality neuromorphic vision sensor, including: a first-type current-mode APS circuit and a voltage-mode APS circuit;

the first-type current-mode APS circuit includes a target first-type photosensitive device; and the target first-type photosensitive device is configured to obtain a target light signal, and convert the target light signal into a first-type current signal, and the first-type current-mode APS circuit is configured to output, based on a difference between the first-type current signal and a sum of second-type current signals converted by a first preset quantity of non-target first-type photosensitive devices around the target first-type photosensitive device, a specified digital signal representing light intensity gradient information in the target light signal;

the voltage-mode APS circuit includes a second-type photosensitive device, the second-type photosensitive device is configured to obtain the target light signal, extract a light signal of a specified frequency band from the target light signal, and convert the light signal of the specified frequency band into a third-type current signal, and the voltage-mode APS circuit is configured to output, based on the third-type current signal, a target voltage signal representing light intensity information in the target light signal; and wherein, each of the non-target first-type photosensitive devices is connected to a first-type control switch in series.

Preferably, the first-type current-mode APS circuit further includes: a first current amplifier, a comparator (CP), an adder, and a digital-to-analog converter (DAC);

the target first-type photosensitive device is connected to the first current amplifier, and the first current amplifier is connected to an input end of the CP;

an input end of the adder is connected to the first-type control switch, and an output end of the adder is connected to the other input end of the CP; and an output end of the CP is connected to the DAC, the DAC converts an inputted specified digital signal into a specified analog signal, and outputs the specified analog signal to the first current amplifier or the adder, until the output end of the CP outputs an event pulse signal, the first-type current-mode APS circuit outputs the specified digital signal, and the specified digital signal is used for representing light intensity gradient information in the target light signal.

Preferably, the first-type current-mode APS circuit further includes: a three-state gate circuit; and the three-state gate circuit is connected to the output end of the CP and an input end of the DAC; and the three-state gate circuit is configured to output the specified digital signal when the output end of the CP outputs the event pulse signal.

Preferably, the voltage-mode APS circuit specifically includes: a second preset quantity of second-type photosensitive devices around the target first-type photosensitive device, each of the second-type photosensitive devices is connected to a second-type control switch in series, and at a same moment, only one second-type control switch is in a conductive state;

the voltage-mode APS circuit further includes a current integrator (CI), a shutter, and an analog-to-digital converter (ADC), each of the second-type photosensitive devices and the second-type control switch connected thereto in series form a device branch, and all device branches are connected in parallel and share the CI, the shutter, and the ADC; and the CI is configured to obtain a voltage analog signal of a target capacitor in the voltage-mode APS circuit; the shutter is configured to control integration time of the CI;

and the ADC is configured to convert the voltage analog signal of the target capacitor into the target voltage signal.

Preferably, the dual-modality neuromorphic vision sensor further includes: a second-type current-mode APS circuit, wherein the second-type current-mode APS circuit includes a non-target first-type photosensitive device and a second preset quantity of current mirrors; and the current mirrors are each connected to a target first-type photosensitive device around the non-target first-type photosensitive device in series.

Preferably, the target first-type photosensitive devices, the non-target first-type photosensitive devices, and the second-type photosensitive devices are arranged to form a pixel array of the dual-modality neuromorphic vision sensor; and in each row of the pixel array, the second-type photosensitive device and the target first-type photosensitive device are arranged alternately, or the second-type photosensitive device and the non-target first-type photosensitive device are arranged alternately.

Preferably, the second-type photosensitive device specifically includes a color filter (CF) and a photo-diode (PD); and the CF is configured to obtain the target light signal and extract the light signal of the specified frequency band from the target light signal; and the PD is configured to convert the light signal of the specified frequency band into the third-type current signal.

Preferably, the first-type current-mode APS circuit further includes: a second current amplifier, where the second current amplifier is connected between the target second-type photosensitive device and the first current amplifier.

Preferably, the target voltage signal and the specified digital signal form an image.

Preferably, the dual-modality neuromorphic vision sensor further includes two storage units; and the two storage units are configured to store the target voltage signal and the specified digital signal respectively.

Embodiments of the present disclosure provide a dual-modality neuromorphic vision sensor. On the one hand, a first-type current-mode APS circuit can mimic excitatory rod cells, to perceive light intensity gradient information in a target light signal, thereby improving a dynamic arrange of an image sensed by a neuromorphic vision sensor and its shooting speed. In addition, a first-type control switch is introduced for each of non-target first-type photosensitive devices, to control the obtained light intensity gradient information, and adjust the dynamic arrange of the image sensed by the neuromorphic vision sensor, thereby adjusting the shooting speed, and realizing a reconfigurable effect. On the other hand, a voltage-mode APS can mimic cone cells, to output a target voltage signal representing light intensity information in the target light signal, and perceive the light intensity information in the target light signal. In this way, the obtained light intensity information represented by the target voltage signal has a higher precision, and an image with higher quality can be obtained, that is, the image has a higher signal-noise ratio.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DETAILED DESCRIPTION OF THE EMBODIMENTS

In order to make the objectives, technical solutions and advantages of the embodiments of the present disclosure clearer, the technical solutions in the embodiments of the present disclosure are clearly and completely described below in conjunction with the drawings in the embodiments of the present disclosure. Apparently, the described embodiments are some rather than all of the embodiments of the present disclosure. On the basis of the embodiments of the present disclosure, all other embodiments acquired by those of ordinary skill in the art without making inventive efforts fall within the scope of protection of the present disclosure.

It should be noted that in the description of the embodiments of the present disclosure, the terms such as "center", "top", "bottom", "left", "right", "vertical", "horizontal", "inner" and "outer" indicate the orientation or position relationships based on the drawings. These terms are merely intended to facilitate description of the embodiments of the present disclosure and simplify the description, rather than to indicate or imply that the mentioned apparatus or element must have a specific orientation and must be constructed and operated in a specific orientation. Therefore, these terms should not be construed as a limitation to the embodiments of the present disclosure. In addition, the terms such as "first", "second", and "third" are used only for descriptive purposes, and should not be construed as indicating.

In the description of the embodiments of the present disclosure, unless otherwise clearly specified, the terms such as "mounting", "interconnection", and "connection" are intended to be understood in a broad sense. For example, the "connection" may be a fixed connection, a detachable connection or an integrated connection; a mechanical connection or an electrical connection; or a direct connection, an indirect connection via a medium, or inner communication between two elements. A person of ordinary skill in the art may understand specific meanings of the foregoing terms in the embodiments of the present disclosure based on a specific situation.

The embodiments of the present disclosure provide a dual-modality neuromorphic vision sensor, including: a first-type current-mode APS circuit and a voltage-mode APS circuit;

the first-type current-mode APS circuit includes a target first-type photosensitive device; and the target first-type photosensitive device is configured to obtain a target light signal, and convert the target light signal into a first-type current signal, and the first-type current-mode APS circuit is configured to output, based on a difference between the first-type current signal and a sum of second-type current signals converted by a first preset quantity of non-target first-type photosensitive devices around the target first-type photosensitive device, a specified digital signal representing light intensity gradient information in the target light signal;

the voltage-mode APS circuit includes a second-type photosensitive device, the second-type photosensitive device is configured to obtain the target light signal, extract a light signal of a specified frequency band from the target light signal, and convert the light signal of the specified frequency band into a third-type current signal, and the voltage-mode APS circuit is configured to output, based on the third-type current signal, a target voltage signal representing light intensity information in the target light signal; and wherein, each of the non-target first-type photosensitive devices is connected to a first-type control switch in series.

Figure 1:
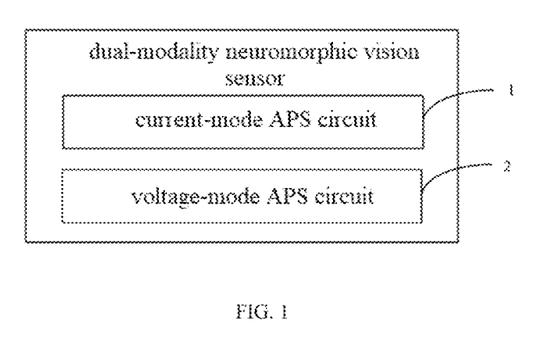
FIG. 1 is a schematic structural diagram of a dual-modality neuromorphic vision sensor according to an embodiment of the present disclosure.

Specifically, the embodiments of the present disclosure provide a dual-modality neuromorphic vision sensor. Its pixel array is formed by a photosensitive device, which is controlled by a control circuit. As shown in FIG. 1, the control circuit includes a current-mode APS circuit 1 and a voltage-mode APS circuit 2. The photosensitive devices in the neuromorphic vision sensor can sense different types of light, and therefore are classified into first-type photosensitive devices and second-type photosensitive devices. The first-type photosensitive device is configured to directly sense the target light signal. The second-type photosensitive device is configured to sense the color component in the target light signal. In the embodiments of the present disclosure, the color component in the target light signal is marked as a light signal of a specified frequency band, that is, the first-type photosensitive device is configured to obtain the target light signal, and convert the target light signal into a current signal. The second-type photosensitive device is configured to obtain a target light signal, extract a light signal of a specified frequency band from the target light signal, and convert the light signal of the specified frequency band into a current signal.

The target light signal refers to the light signal reflected by the surface of the target object. The target light signal may be irradiated on the first-type photosensitive device or the second-type photosensitive device directly, through a collimating lens, or through a cover item. The wave band of the target light signal may be visible, that is, the target light signal may be a visible light signal. The target object refers to an object that is observed with human eyes, and may be a real object, an image, or another form. The specific shape of the target object is not limited in the present disclosure.

The quantities of the first-type photosensitive devices and the second-type photosensitive devices may be set according to a need. The first-type photosensitive device and its control circuit can mimic the rod cells, and the second-type photosensitive device and its control circuit can mimic the cone cells. The first-type photosensitive device may specifically include a target first-type photosensitive device and a non-target first-type photosensitive device rather than the target first-type photosensitive device. The target first-type photosensitive device and its control circuit can mimic excitatory rod cells, and the non-target first-type photosensitive device and its control circuit can mimic inhibitory rod cells. In the embodiments of the present disclosure, to distinguish the current signals obtained through conversion by the first-type photosensitive device and the second-type photosensitive device, the current signal obtained through conversion by the target first-type photosensitive device is marked as a first-type current signal. The current signal obtained through conversion by the non-target first-type photosensitive device is marked as a second-type current signal. The current signal obtained through conversion by the second-type photosensitive device is marked as a third-type current signal.

The first-type photosensitive device in the dual-modality neuromorphic vision sensor is controlled by a current-mode APS circuit. The quantity of the current-mode APS circuits may be determined according to the quantity of the target first-type photosensitive devices. In the embodiments of the present disclosure, to distinguish the control circuits of the target first-type photosensitive device and the non-target first-type photosensitive device, a control circuit of the target first-type photosensitive device is marked as a first-type current-mode APS circuit. The control circuit of the non-target first-type photosensitive device is marked as a second-type current-mode APS circuit. Each target first-type photosensitive device corresponds to a first-type current-mode APS circuit. Each non-target first-type photosensitive device corresponds to a second-type current-mode APS circuit. The second-type photosensitive device is controlled by the voltage-mode APS circuit. A quantity of the voltage-mode APS circuits may be smaller than or equal to that of the second-type photosensitive devices. The quantity relationship between them is specifically determined according to the quantity of the second-type photosensitive devices and a reuse situation, which is not specifically limited in the embodiments of the present disclosure.

The current-mode APS circuit refers to an APS circuit operating under a current mode, that is, after obtaining the first-type current signal through conversion, the target first-type photosensitive device does not need to integrate it directly, but outputs, based on a difference between the first-type current signal and a sum of second-type current signals converted by a preset quantity of non-target first-type photosensitive devices around the target first-type photosensitive device, a specified digital signal representing light intensity information in the target light signal. the non-target first-type photosensitive devices are each connected to a first-type control switch in series. The first-type control switch may be specifically a metal-oxide-semiconductor (MOS) transistor. All the first-type control switches may be turned on or off at the same time; alternatively, some of them may be turned on or off, which is specifically set according to a need, and is not limited in the embodiments of the present disclosure.

Therefore, the first-type control switch is configurable. Because the first-type control switch determines whether the non-target first-type photosensitive device around the target first-type photosensitive device is efficient, it may be understood that the first-type control switch may be used as a 1-bit convolution kernel with a configurable parameter to perform 1-bit convolution operation within a pixel on the current signal obtained through conversion by the first-type photosensitive device, at a high operation speed, to extract the features.

The voltage-mode APS circuit refers to an APS circuit operating under a voltage mode, that is, after obtaining the third-type current signal through conversion, the second-type photosensitive device needs to integrate it, to obtain a target voltage signal. The target voltage signal represents the light intensity information in the target light signal. The light intensity information is absolute and includes color information.

Embodiments of the present disclosure provide a dual-modality neuromorphic vision sensor. On the one hand, a first-type current-mode APS circuit can mimic excitatory rod cells, to perceive light intensity gradient information in a target light signal, thereby improving a dynamic arrange of an image sensed by a neuromorphic vision sensor and its shooting speed. In addition, a first-type control switch is introduced for each of non-target first-type photosensitive devices, to control the obtained light intensity gradient information, and adjust the dynamic arrange of the image sensed by the neuromorphic vision sensor, thereby adjusting the shooting speed, and realizing a reconfigurable effect. On the other hand, a voltage-mode APS can mimic cone cells, to output a target voltage signal representing light intensity information in the target light signal, and perceive the light intensity information in the target light signal. In this way, the obtained light intensity information represented by the target voltage signal has a higher precision, and an image with higher quality can be obtained, that is, the image has a higher signal-noise ratio.

Based on the foregoing embodiments, in the dual-modality neuromorphic vision sensor provided by this embodiment of the present disclosure, when the light intensity of the target light signal is greater than a first preset value, all the first-type control switches are turned on at the same time. When the light intensity of the target light signal is smaller than a second preset value, all the first-type control switches are turned off at the same time.

Specifically, all the first-type control switches are independent of each other. When one is turned on or off, another one is not affected. The quantity of the switches to be turned on or off may be selected according to a need. For example, all the switches may be turned on or off. In the embodiments of the present disclosure, to obtain a better effect, when the light intensity of the target light signal is greater than the first preset value, all the first-type control switches are turned on at the same time. When the light intensity of the target light signal is smaller than the second preset value, all the first-type control switches are turned off at the same time. The first preset value and the second preset value may be determined according to the type, a parameter, and an ambient light intensity of the photosensitive device. For example, the first preset value may be 10 klux, and the second preset value may be 50 lux. In other words, when the light intensity of the target light signal is greater than the first preset value, it is indicated that the light is strong. In this case, to prevent the DACs and the CPs in the first-type current-mode APS circuit from being saturated, all the first-type control switches are turned on at the same time. In this case, all non-target first-type photosensitive devices are efficient, and the specified digital signal outputted by the first-type current-mode APS circuit is a differential-mode signal, which can make the neuromorphic vision sensor obtain the edge information of an image. When the light intensity of the target light signal is smaller than the second preset value, it is indicated that the light is weak. In this case, a first-type current signal I1 obtained through conversion by the target first-type photosensitive device is small. Therefore, all the first-type control switches are turned off at the same time. In this case, all non-target first-type photosensitive devices are inefficient, and the specified digital signal outputted by the first-type current-mode APS circuit is a common-mode signal, which can make the neuromorphic vision sensor obtain the original information of an image. The first-type current-mode APS circuit provided in the embodiments of the present disclosure includes a gap junction that can mimic human eyes better, thereby improving the dynamic range of an image sensed by the neuromorphic vision sensor.

It should be noted that the light intensity of the target light signal is greater than the first preset value and smaller than the second preset value, it is indicated that the light is moderate. In this case, some of the first-type control switches may be turned on, and some of them may be turned off. When at least one of the first-type control switches is turned on, the specified digital signal outputted by the first-type current-mode APS circuit is a differential-mode signal. When all the first-type control switches are turned off, the specified digital signal outputted by the first-type current-mode APS circuit is a common-mode signal.

Based on the foregoing embodiment, in the dual-modality neuromorphic vision sensor provided by the embodiments of the present disclosure, the first-type current-mode APS circuit further includes: a first current amplifier, a CP, an adder, and a DAC;

the target first-type photosensitive device is connected to the first current amplifier, and the first current amplifier is connected to an input end of the CP;

an input end of the adder is connected to the first-type control switch, and an output end of the adder is connected to the other input end of the CP; and an output end of the CP is connected to the DAC, the DAC converts an inputted specified digital signal into a specified analog signal, and outputs the specified analog signal to the first current amplifier or the adder, until the output end of the CP outputs an event pulse signal, the first-type current-mode APS circuit outputs the specified digital signal, and the specified digital signal is used for representing light intensity gradient information in the target light signal.

Figure 2:
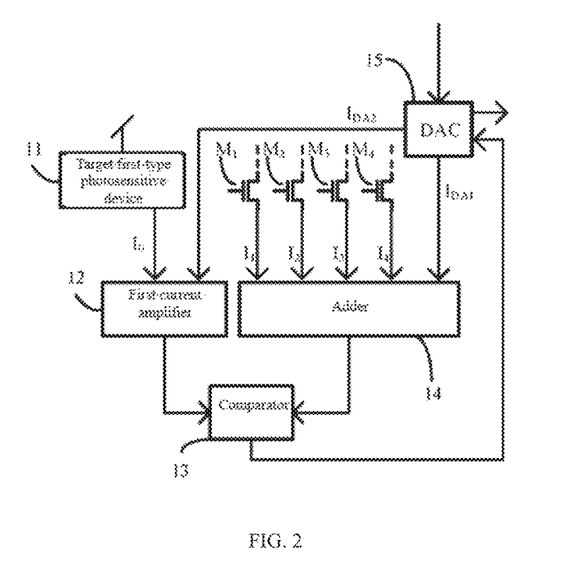
FIG. 2 is a schematic structural diagram of a first-type current-mode APS circuit in the dual-modality neuromorphic vision sensor according to an embodiment of the present disclosure.

Specifically, FIG. 2 shows a first-type current-mode APS circuit provided by the embodiments of the present disclosure, and configured to control a target first-type photosensitive device. In FIG. 2, the first-type current-mode APS circuit includes a target first-type photosensitive device 11, a first current amplifier 12, a CP 13, an adder 14, and a DAC 15. The target first-type photosensitive device 11 is connected to the first current amplifier 12. The first current amplifier 12 is configured to amplify a first current signal I0 obtained through conversion by the target first-type photosensitive device 11 by a first preset quantity of times. In other words, the quantity of amplifying times is equal to that of non-target first-type photosensitive devices around the target first-type photosensitive device 11, to ensure that the amplified first-type current signal and a sum of second-type current signals obtained through conversion by the first preset quantity of non-target second-type photosensitive devices around the target first-type photosensitive device 11 are on a same order of magnitude. It should be noted that the first-type photosensitive device provided by the embodiments of the present disclosure does not include a CF, and therefore the response band of the first-type photosensitive device is related to itself.

The first current amplifier 12 is connected to an input end of the CP 13, to input the amplified first-type current signal into the CP 13. Four non-target first-type photosensitive devices around the target first-type photosensitive device 11 are each connected to an input end of the adder 14. Because the non-target first-type photosensitive devices are each connected to a first-type control switch in series, The embodiments of the present disclosure show only first-type control switches M1, M2, M3, and M4 connected to the non-target first-type photosensitive devices respectively.

An output end of the adder 14 is connected to the other input end of the CP 13. Current signals: I1, I2, I3, and I4 obtained through conversion by the four non-target first-type photosensitive devices are each inputted into the adder 14 for summation. Then, the adder 14 inputs a sum result to the CP 13. The CP 13 compares the amplified first-type current signal with the sum result of the adder 14. When the compared results at a precious moment and at a current moment are constant, no outputting is performed, and the DAC 15 converts an inputted specified digital signal into a specified analog signal, and outputs the specified analog signal to the first current amplifier 12 or the adder 14. The specified analog signal outputted to the first current amplifier 12 is marked as IDA2, and the specified analog signal outputted to the adder 14 is marked as IDA1. The CP 13 compares the specified analog signal after the outputting. When the compared results at a precious moment and at a latter moment are opposite, the output end of the CP 13 outputs an event pulse signal, that is, the CP 13 is in an edge-triggered state. In this case, the first-type current-mode APS circuit outputs the specified digital signal. The specified digital signal is used for representing the light intensity gradient information in the target light signal. The specified digital signal outputted by the first-type current-mode APS circuit is represented by using 0 and 1.

Figure 3:
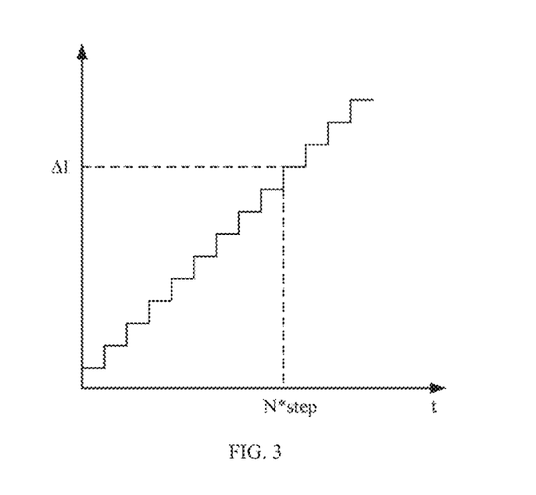
FIG. 3 is a schematic diagram of a change form of a specified digital signal, in the dual-modality neuromorphic vision sensor, inputted from the first-type current-mode APS circuit to a DAC according to an embodiment of the present disclosure.

A specified digital signal that increases periodically may be manually inputted into the DAC 15. The specific change form of the specified digital signal is shown in FIG. 3. The specified digital signal specifically increases in a step-like manner with time. In an N*step at a moment, a value of the specified digital signal is ΔI. If the CP 13 outputs an event pulse signal, that is, the CP 13 is in the edge-triggered state, ΔI at this moment is used as an output of the first-type current-mode APS circuit. N is a quantity of steps passed before, and the step is a duration during which each step is passed.

It should be noted that the adder in the embodiments of the present disclosure may be an actual device or a functional module realizing an adding function by, for example, combining lines where the current signals I1, I2, I3, and I4 are located into one line. In addition, the first current amplifier may be an actual device or a functional module amplifying a current, which is not specifically limited in the embodiments of the present disclosure.

Based on the foregoing embodiment, in the dual-modality neuromorphic vision sensor provided by the embodiments of the present disclosure, the first-type current-mode APS circuit further includes: a three-state gate circuit, where the three-state gate circuit is connected to the output end of the CP and an input end of the DAC; and the three-state gate circuit is configured to output the specified digital signal when the output end of the CP outputs the event pulse signal.

Figure 4:
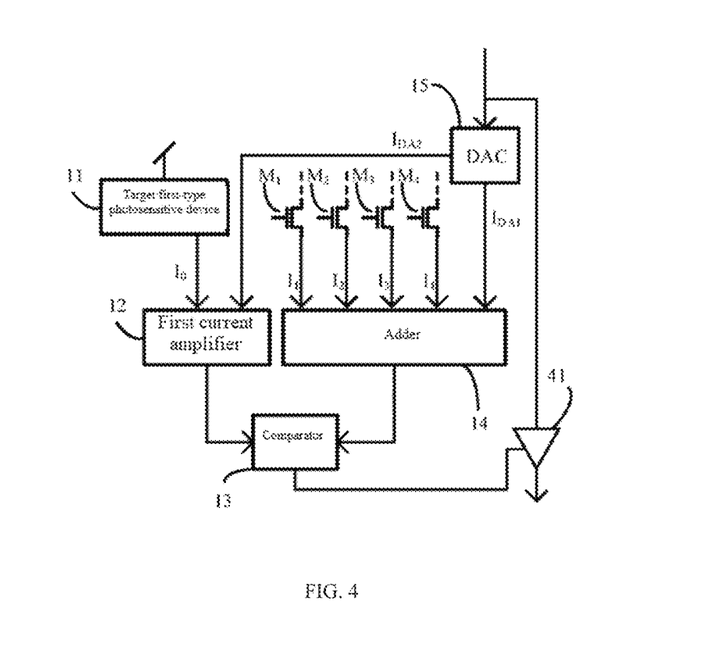
FIG. 4 is a schematic structural diagram of a first-type current-mode APS circuit in the dual-modality neuromorphic vision sensor according to an embodiment of the present disclosure.

Specifically, as shown in FIG. 4, in the embodiments of the present disclosure, the first-type current-mode APS circuit further includes: a three-state gate circuit 41. The three-state gate circuit 41 is connected to an output end of the CP 13 and an input end of the DAC 15. The three-state gate circuit 41 is configured to output the specified digital signal when the output end of the CP 13 outputs an event pulse signal, that is, the CP 13 is in the edge-triggered state.

Figure 5:
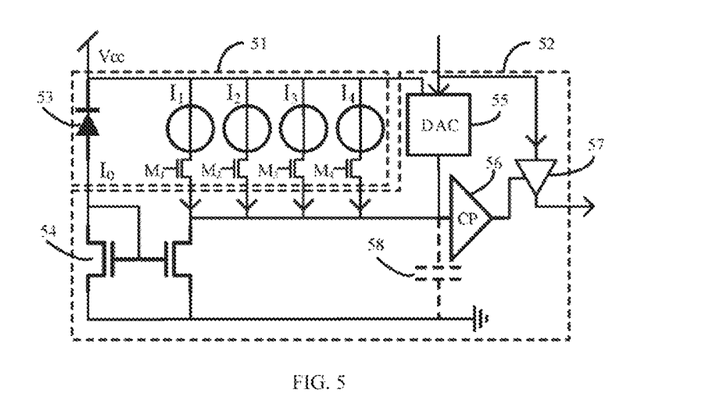
FIG. 5 is a specific schematic structural diagram of a first-type current-mode APS circuit in the dual-modality neuromorphic vision sensor according to an embodiment of the present disclosure.

FIG. 5 is a specific schematic structural diagram of a first-type current-mode APS circuit according to an embodiment of the present disclosure. In FIG. 5, a circuit structure 51 mimics a rod cell circuit, and a circuit structure 52 mimics a ganglion cell and a bipolar cell. Vcc is a power supply of the control circuit, and the target first-type photosensitive device 53 is connected to Vcc. After amplifying the first-type current signal I0 by four times obtained through the target first-type photosensitive device 53, a current mirror 54 is connected to an input end of the CP 56. The current signals obtained through conversion by the four non-target first-type photosensitive devices around the target first-type photosensitive device 53 are I1, I2, I3, and I4 respectively.

It should be noted that the current mirror 54 in FIG. 5 is a first current amplifier. The four non-target first-type photosensitive devices around the target first-type photosensitive device 53 are not shown in FIG. 5, but the first-type control switches M1, M2, M3, and M4 connected to the non-target first-type photosensitive devices respectively are shown there. The adder combines the lines where the current signals I1, I2, I3, and I4 are located into one line. The combined line is connected to an input end of the CP 56. The CP 56 compares the amplified first-type current signal with the sum of I1, I2, I3, and I4. When the compared results at a precious moment and at a current moment are constant, no outputting is performed, and the DAC 55 converts an inputted specified digital signal into a specified analog signal, and outputs the specified analog signal to the target first-type photosensitive device 53 or a non-target first-type photosensitive device. The CP 56 compares the specified analog signal after the outputting. When the compared results at a precious moment and at a latter moment are opposite, the output end of the CP 56 outputs an event pulse signal, that is, the CP 56 is in an edge-triggered state. In this case, the three-state gate circuit 57 outputs the specified digital signal.

In FIG. 5, a capacitor 58 is also connected between the CP 56 and the ground. The capacitor 58 may be an actual capacitor or a virtual parasitic capacitor in the first-type current-mode APS circuit, which is not specifically limited in the embodiments of the present disclosure.

Based on the foregoing embodiment, in the dual-modality neuromorphic vision sensor provided by the embodiments of the present disclosure, the first-type current-mode APS circuit further includes: a storage unit. The storage unit is connected to an output end of the three-state gate circuit, and is configured to store the specified digital signal outputted by the first-type current-mode APS circuit. The storage unit may specifically be a register, a latch, a static random-access memory (SRAM), a dynamic random-access memory (DRAM), a memristor, or the like. Taking the register as an example, the quantity of bits of the register may be selected according to the precision of the DAC. A 4-bit register may be selected in the embodiment of the present disclosure.

Based on the foregoing embodiment, in the dual-modality neuromorphic vision sensor provided by the embodiments of the present disclosure, the voltage-mode APS circuit specifically includes: a second preset quantity of second-type photosensitive devices around the target first-type photosensitive device, the second-type photosensitive devices are each connected to a second-type control switch, and at a same moment, only one second-type control switch is in a conductive state.

The voltage-mode APS circuit further includes a current integrator (CI), a shutter, and an analog-to-digital converter (ADC), each of the second-type photosensitive devices and the second-type control switch connected thereto in series form a device branch, and all device branches are connected in parallel and share the CI, the shutter, and the ADC.

The CI is configured to obtain a voltage analog signal of a target capacitor in the voltage-mode APS circuit; the shutter is configured to control integration time of the CI; and the ADC is configured to convert the voltage analog signal of the target capacitor into the target voltage signal.

Specifically, in the dual-modality neuromorphic vision sensor provided by the embodiments of the present disclosure, a plurality of second-type photosensitive devices may share a voltage-mode APS, that is, each voltage-mode APS circuit includes the second preset quantity of second-type photosensitive devices around the target first-type photosensitive device. It may be understood that the target first-type photosensitive device and the second preset quantity of second-type photosensitive devices around it form a set. The target first-type photosensitive device in the set is controlled by a current-mode APS. All the non-target first-type photosensitive devices in the set are controlled by a voltage-mode APS circuit.

Figure 6:
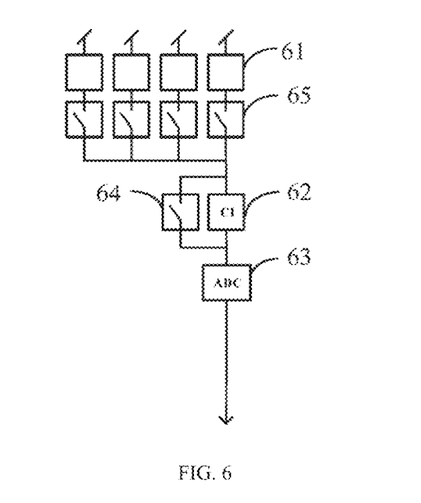
FIG. 6 is a schematic structural diagram of a voltage-mode APS in the dual-modality neuromorphic vision sensor according to an embodiment of the present disclosure.

FIG. 6 is a schematic structural diagram of a current-mode APS circuit according to an embodiment of the present disclosure. FIG. 6 shows four second-type photosensitive devices 61, a CI 62, a shutter 64, and an ADC 63. The second-type photosensitive devices 61 are each connected to a second-type control switch 65, and at a same moment, only one second-type control switch 65 is in a conductive state. Each of the second-type photosensitive devices 61 and the second-type control switch 65 connected thereto in series form a device branch, and four device branches are connected in parallel and share the CI 62, the shutter 64, and the ADC 63. The second-type control switch 65 may be specifically a MOS transistor.

The CI 62 is configured to obtain a voltage analog signal of a target capacitor in the voltage-mode APS circuit; and the ADC 63 is configured to convert the voltage analog signal of the target capacitor into the target voltage signal. The shutter 64 is configured to control integration time of the CI 62. For example, the shutter 64 controls the integration time of the CI 62 to be 33 ms. After 33 ms, the shutter 64 is closed, and the CI 62 obtains the voltage analog signal of the target capacitor, which is read by the ADC 63. In the embodiment of the present disclosure, a storage unit may also be connected to the ADC 63 to store the voltage analog signal of the target capacitor read by the ADC 63. The storage unit 413 may specifically be a register, a latch, a static SRAM, a DRAM, a memristor, or the like. Taking the register as an example, the quantity of bits of the register may be selected according to the precision of the ADC 63. An 8-bit register may be selected in the embodiment of the present disclosure to store the voltage analog signal of the target capacitor. After the ADC 63 reads, the shutter 64 may also be disconnected, and the CI 62 continues to integrate the current of the target capacitor. A video signal can be obtained by circulating the foregoing steps.

Figure 7:
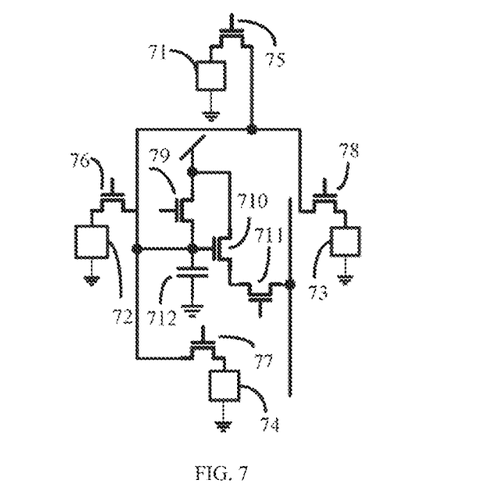
FIG. 7 is a specific schematic structural diagram of a voltage-mode APS in the dual-modality neuromorphic vision sensor according to an embodiment of the present disclosure.

FIG. 7 is a specific schematic structural diagram of a voltage-mode APS circuit according to an embodiment of the present disclosure. FIG. 7 shows four second-type photosensitive devices: 71, 72, 73, and 74. The second-type photosensitive device 71 is connected to the second-type control switch 75 in series, to form a first device branch. The second-type photosensitive device 72 is connected to the second-type control switch 76 in series, to form a second device branch. The second-type photosensitive device 73 is connected to the second-type control switch 78 in series, to form a third device branch. The second-type photosensitive device 74 is connected to the second-type control switch 77 in series, to form a fourth device branch. The first device branch, second device branch, third device branch, and fourth device branch are connected in parallel, and then are connected to the MOSs 79 and 710. The MOS 710 is connected to a MOS 711. The MOS transistor 79 is configured to perform biasing. The MOS transistor 710 is configured to switch on/off. The MOS transistor 711 is configured to perform current integration on the third-type current signal obtained through conversion by a second-type photosensitive device on a device branch to obtain a target voltage signal, which represents the light intensity information in the target light signal.

The voltage-mode APS circuit provided in the embodiments of the present disclosure controls the device branch by using the second-type control switch connected to the second-type photosensitive device in series, thereby controlling a plurality of second-type photosensitive devices, improving the integration of the dual-modality neuromorphic vision sensor.

Based on the foregoing embodiment, the dual-modality neuromorphic vision sensor provided by the embodiments of the present disclosure further includes: a second-type current-mode APS circuit.

The second-type current-mode APS circuit includes a non-target first-type photosensitive device and a second preset quantity of current mirrors.

The current mirrors are each connected to a target second-type photosensitive device around the non-target first-type photosensitive device in series.

Specifically, in the embodiments of the present disclosure, the second-type current-mode APS circuit configured to control the non-target first-type photosensitive device specifically includes: a non-target first-type photosensitive device and a second preset quantity of current mirrors. The current mirrors are each connected to a target first-type photosensitive device around the non-target first-type photosensitive device in series. In other words, the second-type current-mode APS circuits in the embodiments of the present disclosure each control a non-target first-type photosensitive device.

Figure 8:
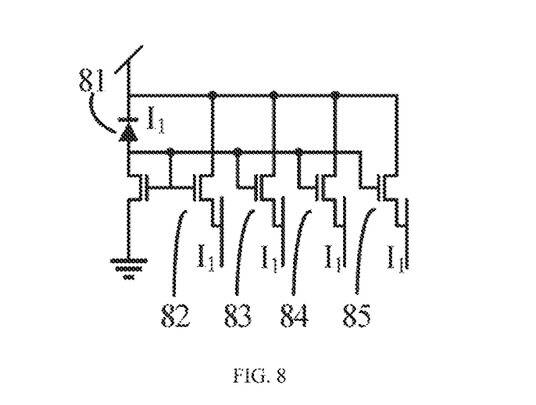
FIG. 8 is a specific schematic structural diagram of a second-type current-mode APS circuit in the dual-modality neuromorphic vision sensor according to an embodiment of the present disclosure.

As shown in FIG. 8, the second-type current-mode APS circuit includes a non-target first-type photosensitive device 81 and four first-type current mirrors 82, 83, 84, and 85. The first-type current mirrors are each connected to a target first-type photosensitive device around the non-target first-type photosensitive device 81, that is, a current signal h obtained through conversion by the non-target first-type photosensitive device 81 is copied into four hs, which are each used for including the light intensity gradient information in the target light signal obtained by the first-type current-mode APS circuit of a target first-type photosensitive device around the non-target first-type photosensitive device 81, to reuse the non-target first-type photosensitive device, and improve the pixel fill factor of the dual-modality neuromorphic vision sensor.

Based on the foregoing embodiment, in the dual-modality neuromorphic vision sensor provided by the embodiments of the present disclosure, the first-type photosensitive device is specifically a PD or may be another device to convert a light signal into a current signal, which is not specifically limited in the embodiments of the present disclosure. It should be noted that the first-type photosensitive device does not include a CF.

Based on the foregoing embodiment, in the dual-modality neuromorphic vision sensor provided by the embodiments of the present disclosure, the second-type photosensitive device specifically includes a CF and a PD.

The CF is configured to obtain the target light signal and extract the light signal of the specified frequency band from the target light signal; and the PD is configured to convert the light signal of the specified frequency band into the third-type current signal.

Specifically, in the embodiments of the present disclosure, the second-type photosensitive device is configured to sense the color component in the target light signal. The second-type photosensitive device may include a PD and a CF disposed on the PD. An image obtained finally by the dual-modality neuromorphic vision sensor is colorful. The CF is configured to obtain the target light signal and extract a light signal of a specified frequency band from the target light signal. The PD converts the light signal of the specified frequency band into the third-type current signal. The CF may be specifically a filter or lens configured to transmit the light signal of a specified wave. When the CF is a lens, a Byron lens may be specifically selected, and other types of lenses may also be selected. The CFs can be classified into red CFs, blue CFs, and green CFs according to the wavelengths of the transmitted light signals, and the light signals transmitted by them are red light signals, blue light signals, and green light signals.

It should be noted that the second-type photosensitive device may be further formed by the PD. PDs with different response curves are selected to obtain the target light signal, extract a light signal of a specified wave band from the target light signal, and convert the light signal of the specified wave band into a third-type current signal.

Based on the foregoing embodiment, in the dual-modality neuromorphic vision sensor provided by the embodiments of the present disclosure, the target first-type photosensitive device, the non-target first-type photosensitive device, and the second-type photosensitive device are arranged to form a pixel array of the dual-modality neuromorphic vision sensor.

In each row of the pixel array, the second-type photosensitive device and the target first-type photosensitive device are arranged alternately, or the second-type photosensitive device and the non-target first-type photosensitive device are arranged alternately.

Figure 9:
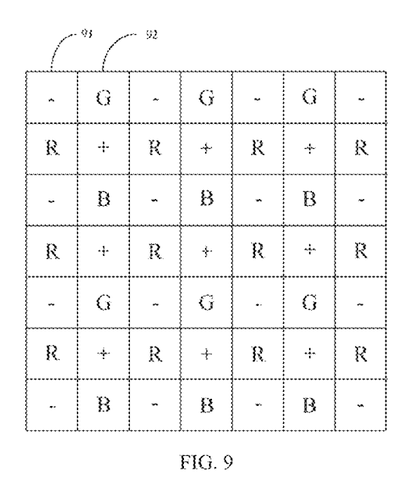
FIG. 9 is a schematic structural diagram of an arrangement manner of a pixel array in the dual-modality neuromorphic vision sensor according to an embodiment of the present disclosure.

Specifically, FIG. 9 is a schematic structural diagram of an arrangement manner of the pixel array, and shows a first-type photosensitive device 91 and a second-type photosensitive device 92. Each first-type photosensitive device and each second-type photosensitive device form a pixel. A target first-type photosensitive device in the first-type photosensitive device 91 is marked as "+", and a non-target first-type photosensitive device is marked as "−". A second-type photosensitive device 92 including a red CF is marked as "R". A second-type photosensitive device 92 including a blue CF is marked as "B". A second-type photosensitive device 92 including a green CF is marked as "G". Four non-target first-type photosensitive devices and four second-type photosensitive devices are around each target first-type photosensitive device. Four target first-type photosensitive devices and four second-type photosensitive devices are around each non-target first-type photosensitive device.

Figure 10:
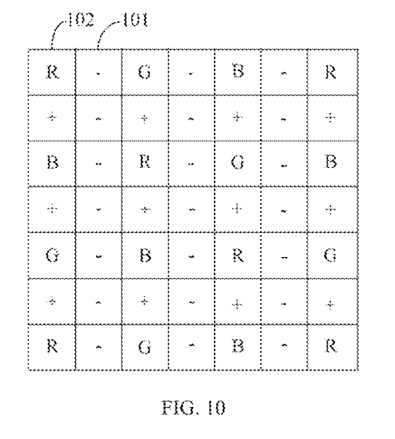
FIG. 10 is a schematic structural diagram of an arrangement manner of a pixel array in the dual-modality neuromorphic vision sensor according to an embodiment of the present disclosure.

Specifically, FIG. 10 is a schematic structural diagram of an arrangement manner of the pixel array, and shows a first-type photosensitive device 101 and a second-type photosensitive device 102. In the first-type photosensitive device 101, the target first-type photosensitive device is marked as "+", and the non-target first-type photosensitive device is marked as "−". A second-type photosensitive device 102 including a red CF is marked as "R". A second-type photosensitive device 102 including a blue CF is marked as "B". A second-type photosensitive device 102 including a green CF is marked as "G". Six non-target first-type photosensitive devices and two second-type photosensitive devices are around each target first-type photosensitive device. Two target first-type photosensitive devices and four second-type photosensitive devices are around each non-target first-type photosensitive device. Alternatively, four target first-type photosensitive devices and two second-type photosensitive devices are around each non-target first-type photosensitive device. The pixel array may be arranged in another form, which is not specifically limited in the embodiments of the present disclosure.

Correspondingly, a first preset quantity and a second preset quantity corresponding to the pixel array shown in FIG. 9 are both 4. For the pixel array shown in FIG. 10, a corresponding first preset quantity is 6, and a corresponding second preset quantity is 2 or 4. In the embodiment of the present disclosure, description is made by using the pixel array shown in FIG. 9 as an example. For example, the second-type photosensitive device 71 in FIG. 7 may be marked as "G". The second-type photosensitive device 72 and 73 may be marked as "R". The second-type photosensitive device 74 may be marked as "B".

Based on the foregoing embodiment, in the dual-modality neuromorphic vision sensor provided by the embodiments of the present disclosure, the first-type current-mode APS circuit further includes: a second current amplifier.

The second current amplifier is connected between the target second-type photosensitive device and the first current amplifier.

Specifically, in the embodiments of the present disclosure, because the current signal obtained through conversion by the first-type photosensitive device is small, the second current amplifier may be connected between the first current amplifier and the target first-type photosensitive device, and is configured to preliminarily amplify the first-type current signal obtained through conversion by the target first-type photosensitive device. The second current amplifier may be an actual device or a functional module amplifying a current, which is not specifically limited in the embodiments of the present disclosure. Correspondingly, a second current amplifier is further disposed between the non-target first-type photosensitive device around the target first-type photosensitive device and the adder, to make a current signal of a branch where the non-target first-type photosensitive device before the adder and a current signal of a branch where the target first-type photosensitive device is located on a same order of magnitude.

Based on the foregoing embodiment, in the dual-modality neuromorphic vision sensor in the embodiments of the present disclosure, the target voltage signal and the specified digital signal form an image.

Specifically, in the embodiments of the present disclosure, the target voltage signal and the specified digital signal form an image. It should be noted that the target voltage signal and the specified digital signal are outputted at different forms and at different speeds. The target voltage signal is outputted at a speed of 30 ms. Because a scanning speed of the DAC in the first-type current-mode APS circuit is 1 ms, the output is expressed in an asynchronous event address, specifically, (X, Y, P, T). "X, Y" represents an event address, "P" represents a 4-value event output (including a first sign bit), and "T" is time when the event is generated.

Figure 11:
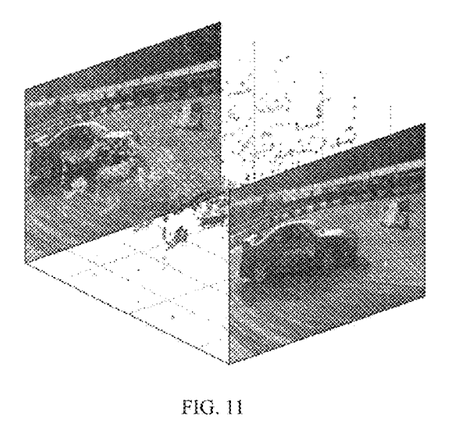
FIG. 11 is a schematic diagram of an image outputted finally by the dual-modality neuromorphic vision sensor according to an embodiment of the present disclosure.

The finally outputted image is shown in FIG. 11. Two frames of images are colorful, which are formed by the successively outputted target voltage signals, and the edge points between the two frames of images are formed by the outputted specified digital signals.

Finally, it should be noted that the foregoing embodiments are used only to explain the technical solutions of the present disclosure, but are not intended to limit the present disclosure. Although the present disclosure has been described in detail with reference to the foregoing embodiments, those of ordinary skill in the art should understand that they can still modify the technical solutions described in the foregoing embodiments, or make equivalent substitutions on some technical features therein. The modifications or substitutions do not make the essence of the corresponding technical solutions deviate from the spirit and scope of the technical solutions of the embodiments of the present disclosure.

What is claimed is:

1. A dual-modality neuromorphic vision sensor, comprising a first-type current-mode active pixel sensor (APS) circuit and a voltage-mode APS circuit;
   the first-type current-mode APS circuit comprises a target first-type photosensitive device; and the target first-type photosensitive device is configured to obtain a target light signal, and convert the target light signal into a first-type current signal, and the first-type current-mode APS circuit is configured to output, based on a difference between the first-type current signal and a sum of second-type current signals converted by a first preset quantity of non-target first-type photosensitive devices around the target first-type photosensitive device, a specified digital signal representing light intensity gradient information in the target light signal;
   the voltage-mode APS circuit comprises a second-type photosensitive device, the second-type photosensitive device is configured to obtain the target light signal, extract a light signal of a specified frequency band from the target light signal, and convert the light signal of the specified frequency band into a third-type current signal, and the voltage-mode APS circuit is configured to output, based on the third-type current signal, a target voltage signal representing light intensity information in the target light signal;
   wherein, each of the non-target first-type photosensitive devices is connected to a first-type control switch in series.

2. The dual-modality neuromorphic vision sensor according to claim 1, wherein the first-type current-mode APS circuit further comprises: a first current amplifier, a comparator (CP), an adder, and a digital-to-analog converter (DAC); the target first-type photosensitive device is connected to the first current amplifier, and the first current amplifier is connected to an input end of the CP;
   an input end of the adder is connected to the first-type control switch, and an output end of the adder is connected to the other input end of the CP; and an output end of the CP is connected to the DAC, the DAC converts an inputted specified digital signal into a specified analog signal, and outputs the specified analog signal to the first current amplifier or the adder, until the output end of the CP outputs an event pulse signal, the first-type current-mode APS circuit outputs the specified digital signal, and the specified digital signal is used for representing light intensity gradient information in the target light signal.

3. The dual-modality neuromorphic vision sensor according to claim 2, wherein the first-type current-mode APS circuit further comprises: a three-state gate circuit;
   the three-state gate circuit is connected to the output end of the CP and an input end of the DAC; and
   the three-state gate circuit is configured to output the specified digital signal when the output end of the CP outputs the event pulse signal.

4. The dual-modality neuromorphic vision sensor according to claim 1, wherein the voltage-mode APS circuit specifically comprises: a second preset quantity of second-type photosensitive devices around the target first-type photosensitive device, each of the second-type photosensitive devices is connected to a second-type control switch in series, and at a same moment, only one second-type control switch is conducted;
   the voltage-mode APS circuit further comprises a current integrator (CI), a shutter, and an analog-to-digital converter (ADC), each of the second-type photosensitive devices and the second-type control switch connected thereto in series form a device branch, and all device branches are connected in parallel and share the CI, the shutter, and the ADC; and
   the CI is configured to obtain a voltage analog signal of a target capacitor in the voltage-mode APS circuit; the shutter is configured to control integration time of the CI; and the ADC is configured to convert the voltage analog signal of the target capacitor into the target voltage signal.

5. The dual-modality neuromorphic vision sensor according to claim 4, further comprising: a second-type current-mode APS circuit, wherein the second-type current-mode APS circuit comprises a non-target first-type photosensitive device and the second preset quantity of current mirrors; and each of the current mirrors is connected to a target first-type photosensitive device around the non-target first-type photosensitive device in series.

6. The dual-modality neuromorphic vision sensor according to claim 1, wherein the target first-type photosensitive devices, the non-target first-type photosensitive devices, and the second-type photosensitive devices are arranged to form a pixel array of the dual-modality neuromorphic vision sensor; and
   in each row of the pixel array, the second-type photosensitive device and the target first-type photosensitive device are arranged alternately, or the second-type photosensitive device and the non-target first-type photosensitive device are arranged alternately.

7. The dual-modality neuromorphic vision sensor according to claim 1, wherein the second-type photosensitive device specifically comprises a color filter (CF) and a photo-diode (PD); and the CF is configured to obtain the target light signal and extract the light signal of the specified frequency band from the target light signal; and the PD is configured to convert the light signal of the specified frequency band into the third-type current signal.

8. The dual-modality neuromorphic vision sensor according to claim 1, wherein the first-type current-mode APS circuit further comprises: a second current amplifier; and the second current amplifier is connected between the target second-type photosensitive device and the first current amplifier.

9. The dual-modality neuromorphic vision sensor according to claim 1, wherein the target voltage signal and the specified digital signal form an image.

10. The dual-modality neuromorphic vision sensor according claim 1, further comprising two storage units, wherein the two storage units are configured to store the target voltage signal and the specified digital signal respectively.

* * * * *